(No Model.) 2 Sheets—Sheet 1.
H. KILLAM.
HEAT REGULATOR FOR INCUBATORS.
No. 353,865. Patented Dec. 7, 1886.
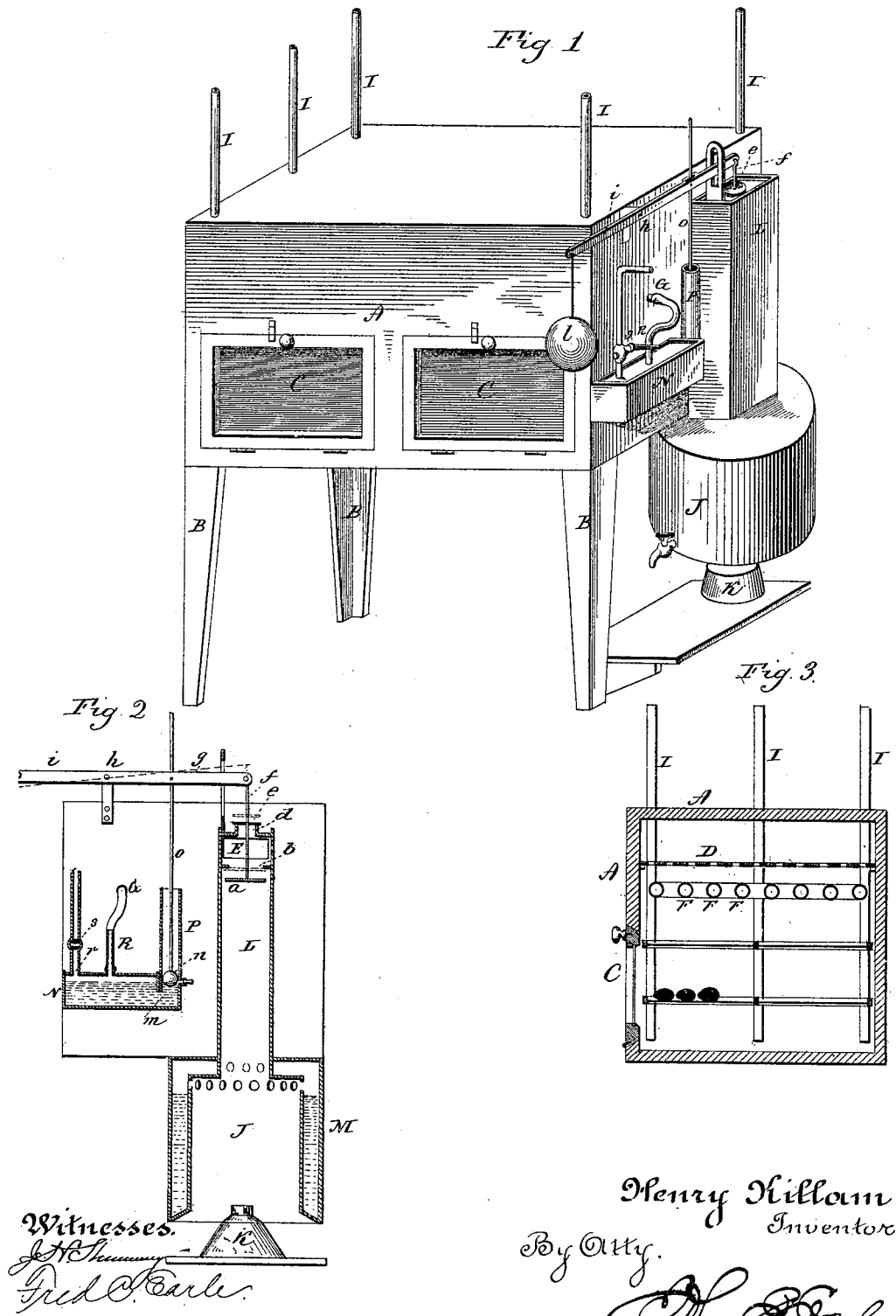

(No Model.)  2 Sheets—Sheet 2.

H. KILLAM.
HEAT REGULATOR FOR INCUBATORS.

No. 353,865. Patented Dec. 7, 1886.

Witnesses,
J. H. Shumway
Fred C. Earle

Henry Killam
Inventor
By Atty.
Jno. C. Earle

UNITED STATES PATENT OFFICE.

HENRY KILLAM, OF NEW HAVEN, CONNECTICUT.

HEAT-REGULATOR FOR INCUBATORS.

SPECIFICATION forming part of Letters Patent No. 353,865, dated December 7, 1886.

Application filed May 24, 1886. Serial No. 203,109. (No model.)

*To all whom it may concern:*

Be it known that I, HENRY KILLAM, of New Haven, in the county of New Haven and State of Connecticut, have invented a new and useful Improvement in Heat-Regulators for Incubators; and I do hereby declare the following, when taken in connection with the accompanying drawings and the letters of reference marked thereon, to be a full, clear, and exact description of the same, and which said drawings constitute part of this specification, and represent, in—

Figure 4:
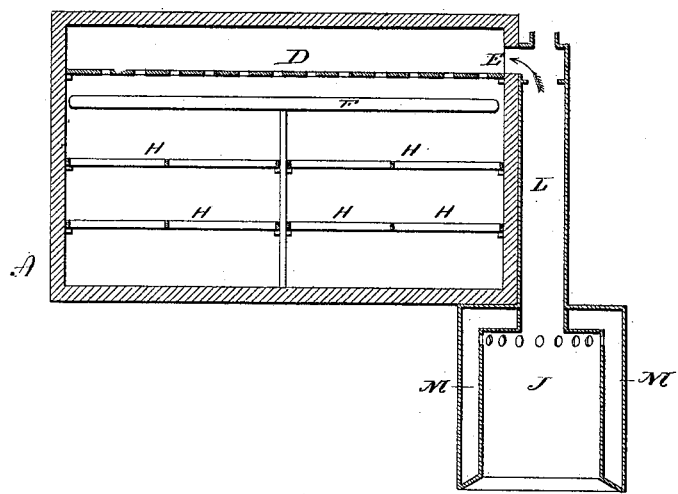
Figure 5:
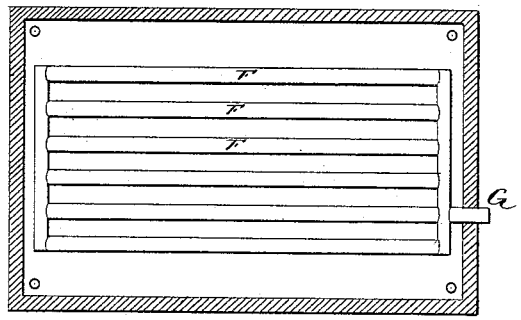
Figure 6:
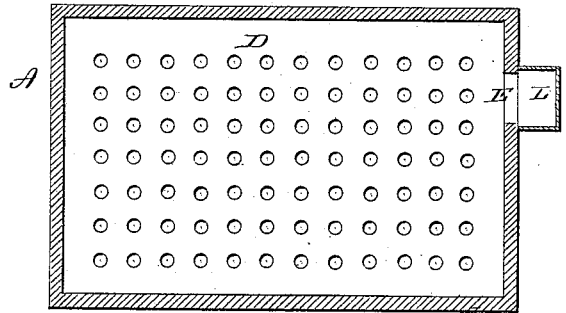

Figure 1, a perspective view of the apparatus complete; Fig. 2, a transverse section at the heating end of the apparatus cutting through the heating-chamber, flue, reservoir, and regulating apparatus; Fig. 3, a transverse section through the hatching-chamber; Fig. 4, a longitudinal section through the hatching-chamber cutting through the heating apparatus; Fig. 5, a horizontal section cutting between the air-distributer and the air-chamber; Fig. 6, a horizontal section cutting above the air-distributer.

This invention relates to an improvement in apparatus for artificially hatching eggs, commonly called "incubators," the hatching being produced by artificial heat introduced into the chamber containing the eggs.

The object of the invention is to insure a perfect uniformity of heat, as well as a constant circulation of air, and to maintain the requisite degree of moisture within the hatching-chamber; and it consists in the construction as hereinafter described, and particularly recited in the claims.

A represents the case, which is supported at the proper elevation upon legs B. The size and capacity of the case is in accordance with the number of eggs to be acted upon at one time. The case is provided with doors C, which may be furnished with glass panels, so that the interior may be inspected without opening the doors. Near the top of the chamber formed by the case is a horizontal perforated plate, D, (see Figs. 3, 4, and 6,) above which, through an opening, E, the heated air is introduced, the perforated plate D forming a distributer for the heated air alike into all parts of the chamber.

Immediately below the perforated plate D is an air-chamber, best composed of a system of tubes, F. These tubes are best made by several parallel tubes nearly the length of the chamber, connected at opposite ends, as seen in Fig. 5. The plane of the tubes is parallel with the distributer D, and being immediately below it is readily acted upon by the heated air, which will descend through the air-distributer. The system of tubes is closed except at one end, and that end leads out through one end of the case, as at G. Below the system of tubes, or "air-chamber," as it may be properly called, the hatching-pans H are arranged in the usual manner.

At different points in the chamber flues I are arranged, which lead from the bottom of the chamber upward and outside, as seen in Fig. 3, these flues opening at the bottom from the chamber, and also open at their upper end.

The heating device consists of a chamber, J, adapted to be heated as here represented. Such heat is supplied by means of a suitable lamp, K, as seen in Fig. 2. From this heating-chamber J a flue, L, extends upward and opens into the chamber through the opening E above the distributer, as seen in Fig. 4, so that the heat generated within the chamber J will pass up through the flue L and be turned into the chamber above the distributer, as indicated by the arrow, Fig. 4, and that the requisite amount of moisture may be taken with the air flowing into the chamber I surround the heating-chamber J with a water-reservoir, M, (see Figs. 2 and 4,) with perforations through the wall of the heating-chamber into the reservoir near the top of the heating-chamber, as shown, and so that the heat in the chamber generating a vapor from the water in the reservoir, the vapor will flow through the perforations into the heating-chamber, and there mingle with the air flowing to the hatching-chamber.

To regulate the supply of heat to the hatching-chamber, in order that a uniform temperature may be maintained therein, I arrange a damper, $a$, in the flue L, adapted to close a passage, $b$, below the opening E into the hatching-chamber, as seen in Fig. 2, and in the upper end of the flue above the opening E is an opening, $d$, to the atmosphere outside the chamber, and above this is a damper, $e$. The two dampers $a$ and $e$ are connected by a rod, $f$, which is suspended from one arm, $g$, of a lever, $g\,i$, hung upon a fulcrum, $h$. The other arm, $i$, of the lever is provided with a counter-balance, $l$. By turning the arm $g$ of the lever up or down the lower damper, $a$, will open the passage $b$, and the upper damper, $e$, close the opening $d$, or vice versa, according to the position of the lever, as indicated in broken lines, Fig. 2.

At a convenient position upon the outside of the case, and near the flue, is a water-chamber, N, which communicates with a vertical cylinder, P, the opening between the water-chamber N and the cylinder P being near the bottom of the water in the chamber N, and below its surface, as at $m$, Fig. 2. In the cylinder P is a float, $n$, from which a rod, $o$, extends into connection with the arm $g$ of the lever $g\,i$. The end G of the system of tubing F in the hatching-chamber is connected with the water-chamber N by a suitable tube, R, opening into the water-chamber above the water, as seen in Fig. 2, and into the water-chamber N, above the water, is an opening, $r$, closed by a suitable cock or valve, $s$, to admit air to the water-chamber above the water, or permit its escape therefrom, as may be required.

In operation the float $n$ and dampers $a\,e$ are counterbalanced, so that the float $n$, resting upon the water at a predetermined point, the dampers will be down, so as to open the passage from the flue into the chamber and close the escape-opening $d$ from the flue, and as seen in Fig. 2. This is normally the working condition of the parts, and when so working air passes from the heating-chamber directly into the hatching-chamber, the heated air descending through the distributer D and over the tubes F, which are normally supplied with air, will heat the air in the tubes, as well as in the chamber, to the required standard temperature, and while the temperature is thus being raised to its required point the valve $s$ is open to permit the escape of the expanding air from the air-chamber or system of tubes, F, which flows into the water-chamber N, above the water, and thence out through the opening $r$. When the requisite temperature is attained, the valve $s$ is closed, confining the air of the tubes in the tubes and into the space above the water in the water-chamber N. If the heat rises above this fixed degree, it will cause an increased expansion of air in the air-chamber, which will produce a pressure upon the surface of the water in the chamber N, and thereby cause the water to rise in the cylinder P, and also cause a corresponding rise of the float $n$ and rod $o$, which will raise the arm $g$ of the lever $g\,i$, so as to open the damper $e$ above and permit the escape of the heated air from the flue, until the temperature of the chamber is reduced to its standard degree. Then the air of the tubes contracting, will permit the fall of the water and float in the tube P and the damper $e$ to again close and turn the heat into the hatching-chamber; but should the opening of the damper $e$ not sufficiently reduce the temperature in the hatching-chamber to the standard point the pressure on the water will continue to increase and the float to rise, until finally the damper $a$ will close the passage $b$ below the passage into the hatching-chamber, and thereby entirely cut off the supply of heat. Thus by the expansion or contraction of the air in the air-chamber, and the dampers properly counterbalanced, a most sensitive regulating apparatus is produced, whereby a constant and uniform degree of temperature is maintained in the hatching-chamber, the variation being so slight as not to appreciably change that temperature. The greater the extent of tubes in the system to form the air-chamber, the more sensitive will be the regulating apparatus.

I have described the chamber N as supplied with water; but it will be understood that any suitable fluid may be employed for that purpose.

The moisture being mingled with the air in the heating-chamber, is distributed with it throughout the hatching-chamber in the most perfect manner.

The reservoir M is provided with a faucet for drawing off the surplus water, as well as with a filling-opening by which water may be supplied.

The particular form or shape of the heating apparatus and regulating mechanism is immaterial to the invention, the shape and arrangement of the parts which I have shown being well adapted for the purpose indicated.

The damper $a$ may be omitted, the opening $d$ being ordinarily sufficient to permit the escape of all the heat, which naturally passes up the flue; but I prefer to provide the damper $a$ as a protection against a possible overheating.

While I prefer the distributer D in the hatching-chamber, for producing a better distribution and circulation of air in the hatching-chamber, it may be omitted.

The air-chamber within the hatching-chamber, and which communicates with the fluid-chamber, may be of any desirable shape above the water-chamber and adapted to contain sufficient air, by the expansion of which the dampers may be operated; but I prefer the arrangement of tube described.

While I prefer to generate the heat by the apparatus which I have shown, the heat may be artificially supplied from any source, and the regulating-dampers applied accordingly.

The heating-chamber with the surrounding water-reservoir with openings therefrom into the chamber, and the flue for conducting the heat to the hatching-chamber, may be employed with other regulating apparatus.

While I prefer to make the openings from the water-reservoir directly into the air-chamber below the flue, the openings may be at some point above, as indicated by broken lines, Fig. 2. By the term "opening into the heating-chamber," I therefore wish to be understood as including openings from the reservoir at any point where the vapor arising from the water may mingle with the heated air before it passes into the hatching-chamber.

The apparatus for regulating the heat may be employed for regulating heat to other chambers than incubators. I therefore do not wish to be understood as limiting this part of my invention to an incubator.

I do not wish to be understood as claiming, broadly, a water-reservoir surrounding the heating-chamber, as such I am aware is not new.

I claim—

1. The combination of a hatching-chamber, a heating-chamber with a flue leading therefrom and opening into said hatching-chamber, an air-chamber in said hatching-chamber, a fluid-chamber, N, below said air-chamber, with a connection from said air-chamber to said fluid-chamber above the fluid therein, a float resting on the fluid of said chamber and adapted to rise and fall therewith, a damper in said flue, adapted to open or close a passage therefrom, the said damper and float connected, substantially as described, and whereby the rising or falling of the float will correspondingly open or close said damper, as the case may be.

2. The combination of the hatching-chamber, a heating-chamber, a flue leading therefrom and opening into said hatching-chamber, an air-chamber in said hatching-chamber, consisting of a system of tubes, a fluid-chamber below the said air-chamber, and into which said air-chamber opens above the fluid in the fluid-chamber, a float resting on the fluid of the said chamber and adapted to rise and fall therewith, a damper adapted to open or close an opening in the said flue, the said damper and float connected, substantially as described.

3. The combination of a hatching-chamber, a heating-chamber, a water-reservoir surrounding said heating-chamber, with openings from said reservoir above the water into said heating-chamber, a flue from said heating-chamber extending upward and opening into the hatching-chamber, an air-chamber in said hatching-chamber, a fluid-chamber, the said air-chamber opening into said fluid-chamber above the fluid, a float resting on the fluid of said chamber and adapted to rise and fall therewith, with a damper adapted to open or close the opening from said flue, the said damper and float connected, whereby the up-and-down movement of the float will produce corresponding opening-and-closing movement of the damper, substantially as described.

4. The combination of a hatching-chamber, an air-distributer across said hatching-chamber, a heating-chamber with a flue leading therefrom and opening into the hatching-chamber above said air-distributer, an air-chamber below said air-distributer, a fluid-chamber below, into which said air-chamber opens, a float resting upon the fluid of said chamber, adapted to rise and fall therewith, and a damper in connection with said float, substantially as described.

5. The combination of the hatching-chamber, the perforated air-distributer D, and the system of tubes F, forming an air-chamber in said hatching-chamber and below said perforated air-distributer, a heating-chamber with a flue leading therefrom and opening into said hatching-chamber above said air-distributer, and constructed with an opening, $d$, outside said hatching-chamber, a fluid-chamber, N, below said air-chamber, and into which the said air-chamber opens above the fluid in said fluid-chamber, a float, $n$, resting on the fluid of said chamber and adapted to rise and fall therewith, a damper, $e$, adapted to open or close said opening $d$, the said float and damper connected, whereby the rise and fall of the float will open or close said damper, as the case may be, substantially as described.

6. The combination of a hatching-chamber, a heating-chamber with a flue leading therefrom and opening into said hatching-chamber, the said flue constructed with an opening, $d$, above the opening into the hatching-chamber and outside the hatching-chamber, and also constructed with a passage, $b$, below said opening into the hatching-chamber, an air-chamber in said hatching-chamber, a fluid-chamber below said air-chamber, and into which said air-chamber opens above the fluid therein, with a float resting on the surface of said fluid, and adapted to rise and fall therewith, and dampers $a$ and $e$, connected so that the opening movement of one will impart closing movement to the other, the said two dampers also connected to said float, and whereby under the rising and falling of the float the said dampers will accordingly open and close, respectively, the passage $b$ and opening $d$, substantially as specified.

7. The combination of a hatching-chamber to which artificial heat is supplied, an air-chamber within said hatching-chamber, a fluid-chamber, the said air-chamber communicating with said fluid-chamber above the fluid, a float upon said fluid, and a damper in connection with said float, substantially as described, whereby the supply of heat to the hatching-chamber may be regulated.

8. The combination of a hatching-chamber to which artificial heat is supplied, a perforated air-distributer across said chamber, an air-chamber beneath said air-distributer, a fluid-chamber, the said air-chamber communicating with said fluid-chamber above the fluid therein, a float resting on the fluid of said chamber, and a damper in connection with said float, substantially as described, and whereby the supply of said artificial heat to said hatching-chamber may be regulated.

9. The combination of a hatching-chamber, a system of connected tubes forming an air-chamber in said hatching-chamber, a fluid-chamber into which said air-chamber opens above the fluid, a float resting on the fluid of said chamber, and a damper in connection with said float, substantially as and for the purpose described.

10. The combination of a hatching-chamber, a perforated air-distributer across said chamber, and above which artificial air is admitted, a system of connected tubes beneath the said air-distributer, a fluid-chamber into which said air-chamber opens above the fluid, a float resting on the fluid of said chamber, and a damper in connection with said float, substantially as described.

11. The combination of a hatching-chamber, a heating-chamber, with a flue leading therefrom into said hatching-chamber, and a water-reservoir surrounding said heating-chamber, with perforations therefrom into said heating-chamber, substantially as described.

12. The combination of a chamber and means for admitting heat thereto, with an air-chamber arranged in said chamber to be heated, a fluid-reservoir into which said air-chamber opens above the fluid, a float resting upon said fluid, and adapted to rise and fall therewith, and a damper adapted to open or close the inlet heat-passage, the said damper connected to said float substantially as described, and whereby the rising and falling of the float will correspondingly cut off or open the flow of heat to said chamber, substantially as described.

HENRY KILLAM.

Witnesses:
JOHN E. EARLE,
FRED C. EARLE.